No. 689,438. Patented Dec. 24, 1901.
T. W. TOPHAM.
INTERRUPTER.
(Application filed July 30, 1901.)

(No Model.)

Witnesses
C. W. Smith
W. A. Pauling

Inventor
Thomas W. Topham.
By his Attorneys
Gifford & Bull

UNITED STATES PATENT OFFICE.

THOMAS W. TOPHAM, OF BROOKLYN, NEW YORK.

INTERRUPTER.

SPECIFICATION forming part of Letters Patent No. 689,438, dated December 24, 1901.

Application filed July 30, 1901. Serial No. 70,196. (No model.)

*To all whom it may concern:*

Be it known that I, THOMAS W. TOPHAM, a citizen of the United States, and a resident of the city of New York, borough of Brooklyn, in the county of Kings and State of New York, have invented a new and Improved Interrupter, of which the following is a full, clear, and exact description.

My invention relates to improvements in devices for automatically producing interruptions in the continuity of an electric circuit, or, in other words, rapidly making and breaking the circuit.

My invention comprises the features which are hereinafter described, and will be particularly pointed out in the claims.

Reference is to be had to the accompanying drawings, forming a part of this specification, in which similar characters of reference indicate corresponding parts in all the figures.

Figure 1:
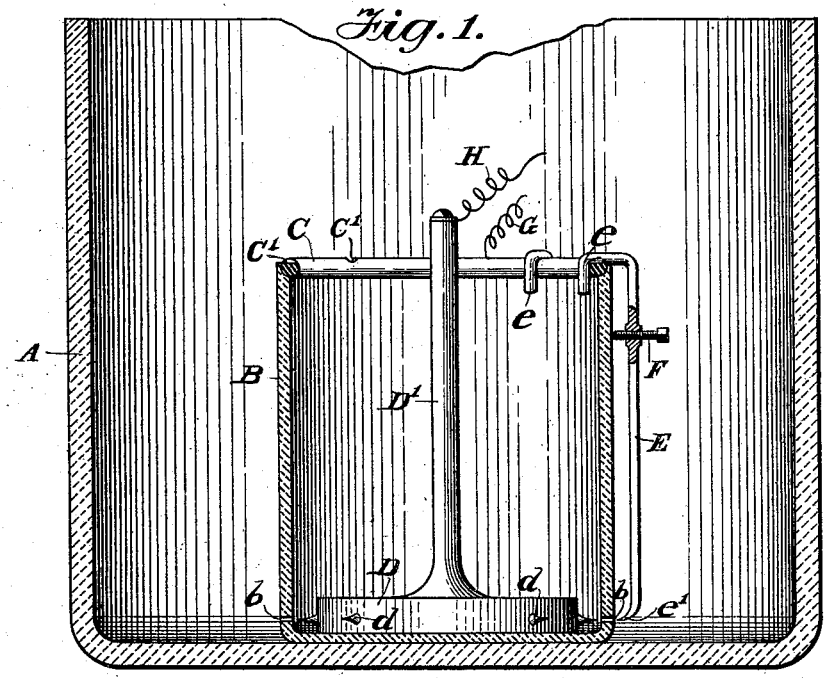
Figure 2:
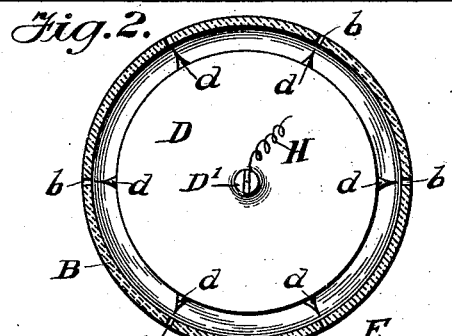
Figure 3:
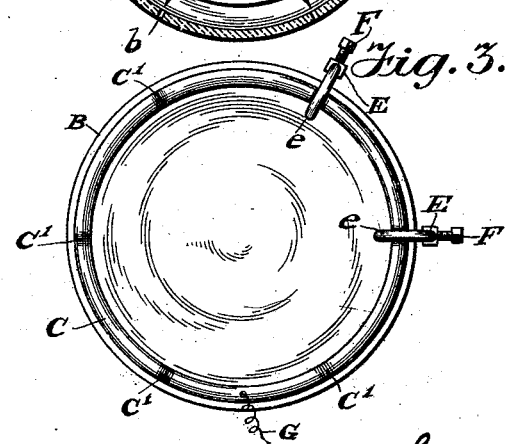

Figure 1 is a sectional elevation of my device. Fig. 2 is a sectional plan of the inner vessel, taken on the line of the discharge-orifices therein and showing the inner electrode in place. Fig. 3 is a plan of the inner vessel, showing the manner of supporting the outer electrodes thereon.

The object of my invention is to produce a device capable of automatically producing a very rapid series of interruptions or breaks in the continuity of an electrical circuit.

With this end in view I provide two cells or vessels or a single vessel divided into two parts by a partition or diaphragm, said cells or vessels being preferably of some material, such as glass or porcelain, which may be used to hold acids without injury, although this feature is not an essential one, as my device may be operated with pure water in the cells. The diaphragm at least, and preferably the whole cell, should be of a non-conducting material, so that the two electrodes are separated by an insulating-shield. The outer vessel A is imperforate, while the inner cell B has a series of small holes $b$ in its side and preferably near its bottom. For the best working of my device there should be at least two of these holes, although I prefer to have a greater number. In the drawings I have shown six holes, which are evenly spaced about the periphery of the cell B. My device is, however, an improvement over former devices of a similar character even if a single hole is used for the discharge of the electricity.

Within the inner cell B is placed an electrode D, which is herein shown as consisting of a disk having a stem D' extending upwardly therefrom and to which is attached a wire H, leading to one pole of the battery, preferably to the negative pole thereof. The base D has a series of receiving or discharging points $d$ projecting therefrom and located so as to be directly opposite the holes $b$ in the inner vessel or cell B and removed only a short distance therefrom. Ordinarily the electrode D would be the receiving-electrode, although the direction of flow may be reversed, in which case it would be the discharging-electrode.

The coöperating electrode is placed outside the cell B and is herein shown as divided into two parts E, although such division is purely a matter of convenience and does not affect the principle involved. The two parts of this electrode each consist of a bar E, which at its lower end has a discharging-point $e'$, adapted to be held close to and directly opposite one of the holes $b$ in the cell B. At their upper ends they are bent or otherwise provided with hooks, as $e$, by which they may be suspended from the upper edge of the cell B. To conveniently adjust the points $e'$ relative to the openings $b$, I provide an adjusting-screw F in each part of the electrode, said screw bearing upon the outer face of the cell B.

In order that the two parts of the electrode may be independent of each other or so that the electrode if made in one piece may be moved to utilize any of the discharge-holes desired, I place a conductor about the upper edge of the cell and connect the feed-wire to this, while the electrode makes connection with the feed-wire through said circular conductor, with which it contacts when it is hung in place on the cell whatever position it occupies about the cell.

The circular conductor as herein shown consists of a ring C, which is placed about and just within the upper edge of the cell. The manner of securing this in place is immaterial. It is herein shown as resting within the upper edge of the cell, which is slightly flared or beveled to receive it. The feed-wire G is secured to it in any convenient manner. With this arrangement the two parts of the electrode may be placed opposite any of the discharge-openings desired. To quickly and conveniently locate them, the ring C is provided with slight notches or depressions C', corresponding in number and position with the number and position of the discharge-openings b, so that when the hook of an electrode is placed in one of the notches C' its point e' will be opposite a discharge-opening b. The lower portion of the cell B and of both electrodes are immersed in a liquid, preferably acidulated, although this is not an essential feature.

The operation of my device is based upon the principle that if a current of electricity is passed through a small opening in a non-conductor, said opening being immersed beneath a liquid, the current will be automatically rapidly broken and restored. This action is attributed to the vaporization of the liquid within the hole, due to the heat generated by the current, the heating of the liquid being caused by the relatively small area of the cross-section of the liquid within the hole as compared with the volume of electricity passing through it. The small bubble of vapor formed breaks the circuit within the hole; but as soon as the circuit is broken the source of heat is stopped and the surrounding body of cool liquid causes the bubble to be condensed and the circuit is restored by the inflow of the liquid. These two actions of breaking and restoring the circuit proceed automatically and with great rapidity.

In devices of this character as previously used, where only a single discharging-opening was provided, it has been found that a flow of the liquid was caused in the direction of the electrical flow and that finally a considerable variation of level of the liquid within and without the cell was caused, and the device eventually refused to work. In my device I have provided openings other than those used for the discharge for the return flow of the liquid, thus keeping the level constant both within and without the cell, thus enabling continuous operation of the device. The same result may be obtained where plural pairs of discharging-points are used by connecting the two pairs, so that the current will flow through the diaphragm in opposite directions, and separating the two pairs sufficiently, so that the resistance through the holes is less than through the liquid between the opposite points which are on the same side of the diaphragm. The liquid flow caused by one pair of points is thus counteracted by the flow caused by the other pair. I have also found an advantage to arise from using plural discharging-points in that the rapidity of the interruptions is much increased thereby. I attribute this to an alternation of the times of formation and condensation of the bubbles in the different holes. Where the volume of electricity used is sufficiently large compared with the area of the holes a bubble will be formed and the current broken in one hole between the times of formation and condensation of the bubble in the other hole. An alternation of action between the two holes is thus caused which practically doubles the number of breaks secured.

The perforations in the cell may be all of the same size or of different size, the difference in size affecting the working of the interrupter to vary the rapidity of the breaks and the intensity of the current. The adjustable electrode may be shifted to whichever holes will produce the effect desired, thus enabling widely-varying results to be secured by the same device.

It is clearly evident that the details and the mechanism by which my invention may be carried out may be widely varied without departing from the spirit thereof. I do not therefore wish to be understood as stating that the forms shown are the only ones known to me in which my invention may be embodied, or that I claim only the construction shown. On the contrary, I am aware that it may be embodied in numerous forms widely differing in appearance, and desire to claim my invention in any form in which it may be embodied. The scope of my invention is to be determined by reference to the claims concluding this specification, in which the omission in any claim of an element or a failure to qualify an element is to be understood as a distinct statement that the element or qualification of an element omitted is not essential to the combination therein claimed.

Having thus fully described my invention, I claim as new and desire to secure by Letters Patent—

1. An electrical-current interrupter comprising a perforated insulating-diaphragm and two complementary discharging-points discharging through the perforation in said diaphragm, a liquid submerging said points and perforation, and means for equalizing the liquid-level on opposite sides of the diaphragm.

2. An electrical-current interrupter, comprising a liquid-containing cell, an insulating-diaphragm dividing said cell into two parts, two coöperating discharging-points on opposite sides of said diaphragm and submerged in the liquid, said diaphragm having a perforation for the passage of the electrical current and another perforation for the flow of liquid.

3. An electrical-current interrupter, comprising a liquid-containing cell, an insulating-diaphragm within said cell and provided with plural submerged perforations for the passage of the electrical current, and plural pairs of discharging-points, the points of each pair connecting and discharging through the liquid in one of said perforations.

4. An electrical-current interrupter, comprising a liquid-containing cell, an insulating-diaphragm within said cell and provided with plural submerged perforations for the passage of the electrical current, and plural pairs of discharging-points, the points of each pair connecting and discharging through the liquid in one of said perforations, and means for maintaining an equality of liquid-level between opposite sides of the diaphragm.

5. An electrical-current interrupter or break, comprising a liquid-containing cell, an insulating-diaphragm dividing said cell into two parts, plural pairs of coöperating discharging-points, the points of each pair lying on opposite sides of the diaphragm and being submerged, said diaphragm having discharging-perforations between the points of each pair for the passage of the current, and also having a perforation for the passage of the liquid.

6. An interrupter comprising plural pairs of discharging-points, each pair discharging through its respective hole in an insulating-plate, said holes being submerged in a liquid.

7. An interrupter comprising an outer and an inner cell, the inner cell being composed of an insulating material and having a series of discharging-holes therein, an electrode within the inner cell and provided with discharging-points adapted to register with the discharging-holes, a complementary electrode outside the inner cell and having discharging-points adapted to register with the same holes in the cell, said holes being adapted to be submerged in a liquid.

8. An interrupter comprising a cell of insulating material having discharging-perforations therein, an electrode within the cell adapted to be connected with one pole of the battery, a conducting-rim about the cell adapted to be connected with the other pole of the battery, and an electrode adapted to be suspended from said rim outside the cell, both said electrodes having discharging-points adapted to register with the perforations in the cell.

9. An interrupter comprising a cell of insulating material having discharging-perforations therein, an electrode within the cell adapted to be connected with one pole of the battery, a conducting-rim about the cell adapted to be connected with the other pole of the battery, and an electrode adapted to be suspended from said rim outside the cell, both said electrodes having discharging-points adapted to register with the perforations in the cell, and means for adjusting the distance of the discharging-points of one electrode toward and from the perforations.

10. An interrupter comprising a cell of insulating material having perforations therein, two electrodes one within and one without said cell, one electrode being made in separable parts whereby the discharge may be conducted through any one of the perforations desired.

11. An interrupter comprising a cell of insulating material having perforations therein, two electrodes one within and one without said cell, and a conducting-ring about the cell, one of the electrodes being made in plural parts adapted to be supported by said ring opposite any of the perforations desired.

12. An interrupter comprising a cell of insulating material having perforations therein, two electrodes one within and one without said cell, and a conducting-ring about the cell and adapted to be connected with one pole of the battery and to also support one of the electrodes opposite any of the perforations desired.

13. An interrupter comprising a cell of insulating material having perforations therein, two electrodes one within and one without said cell, and a conducting-ring about the cell and adapted to be connected with one pole of the battery and having locating devices corresponding with the perforations in the cell and adapted to be engaged by one of the electrodes to locate it.

T. W. TOPHAM.

Witnesses:
 H. L. REYNOLDS,
 A. F. DANNIC.